Figure 1:
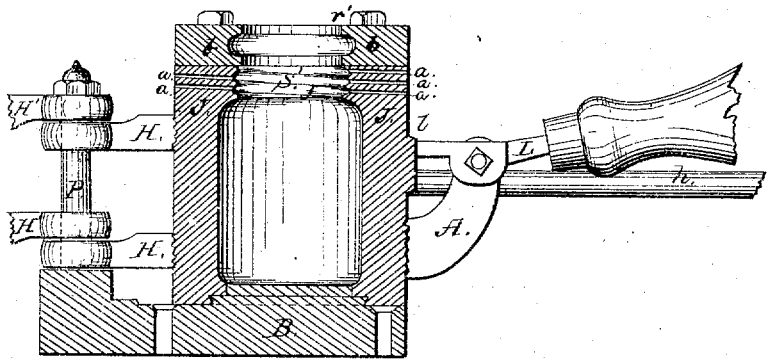
Figure 2:
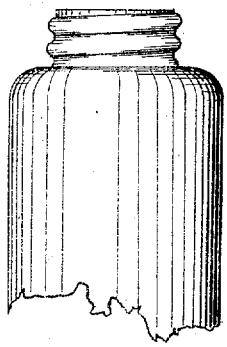

J. L. MASON.

ART OF MAKING SCREW-THREADED GLASS JARS, BOTTLES, &c.

No. 6,904. Reissued Feb. 8, 1876.

Witnesses:

Robt. H. Duncan

Benja. Smith

Inventor:

The Consolidated Fruit Jar Co.
(Assignee of John L. Mason)
by Saml A. Duncan
atty.

UNITED STATES PATENT OFFICE.

JOHN L. MASON, OF NEW YORK, N. Y., ASSIGNOR, BY MESNE ASSIGNMENTS, TO THE CONSOLIDATED FRUIT JAR COMPANY, OF SAME PLACE.

IMPROVEMENT IN THE ART OF MAKING SCREW-THREADED GLASS JARS, BOTTLES, &c.

Specification forming part of Letters Patent No. 22,129, dated November 23, 1858, extended 7 years; reissue No. 6,904, dated February 8, 1876; application filed December 8, 1875.

DIVISION B.

*To all whom it may concern:*

Be it known that JOHN L. MASON, of the city, county, and State of New York, has invented certain new and useful Improvements in the Art of Making Screw-Threaded Glass-Jars, Bottles, &c., of which the following is a full, clear, and exact description:

The invention relates to the manufacture of screw-neck glass jars; and consists in shaping the jar, by methods in common use, in a mold of the desired form, removing the surplus glass from the neck of the jar, so as to leave a narrow rim above the upper end of the screw, and then finishing the lip or top of the neck, from which the surplus glass has been removed by grinding.

A mold of the proper form for shaping screw-threaded glass jars, with full description of its construction and use, is described in Division A of this same reissue, and the same is also shown in the drawing hereto attached.

In forming glass jars in molds, it is found impossible to stop off the glass evenly at a given line in the neck of the mold above the upper end of the screw, so that the jar would be ready, immediately on coming from the mold, to receive the cap; but when the jar leaves the mold there will be a quantity of glass of irregular shape remaining above the screw of the neck, which must be removed and the top of the neck finished up before the jar is fitted for use.

It is essential to economy of construction that this surplus glass be removed from the neck of the jar as evenly as possible, and on a line slightly above the upper end of the screw, leaving above the screw a rim or plain cylindrical space, of such width as to permit the inequalities produced in the top of the neck by the removal of the surplus glass to be reduced by grinding, without injury to the screw, and, at the same time, such that, when the grinding is completed, this rim will be brought down to near the level of the upper end of the screw.

This result is readily and economically accomplished by the use of a "blow-over" located on the mold at the desired distance above the screw-thread. By reason of the lateral expansion of the lower walls of the blow-over, the glass is materially thinned out at the sharp angle formed by the junction of the bottom of the blow-over with the neck of the mold, so that the surplus glass can be easily broken off at the line thus designated.

The process which forms the subject of this patent, then, embraces three distinct steps or stages: forming the jar in the mold; removing the surplus glass on a line slightly above the upper end of the screw, so as to leave a rim or plain cylindrical space on which the grinding can take place without injury to the screw; grinding off the top of the neck of the jar to smooth or finish up the uneven edge formed by the removal of the surplus glass.

After the surplus glass has been removed, the top of the neck of the jar will be left more or less uneven by reason of the irregularity of the fracture. It is desirable that these inequalities be removed, and the top of the neck brought down to a smooth finish. This is effected by grinding the top of the neck of the jar upon any suitable surface. Care should be taken not to grind deep enough to injure the thread of the screw, the rim of the plain cylindrical space above the thread being left for this very purpose.

It is well known that screw-neck bottles have been made previous to this invention by cutting a screw upon the neck after the bottle had left the mold; also, by reheating the neck, applying molten glass thereto, and then subjecting the glass, while in a plastic state, to pressure between screw-threaded jaws. The first of these plans, owing to the cost of manipulation, is applicable, practically, only to high-priced articles, such as cut-glass smelling-bottles, &c.; and the second of these modes of manufacture fails to produce a clean thread, and is necessarily expensive. It has also been proposed to blow jars and bottles in screw-threaded molds, and thus form a thread upon the neck of the vessel simultaneously with the formation of the body of the same; but, in such case, no provision was made for removing the surplus glass on a given line, or for finishing up the lip of the jar or bottle, otherwise than by reheating it in the glory-hole, and smoothing it down while in a plastic state by the ordinary manipulation employed for such purposes.

The main objection to this method was the injury caused to the threads of the screw by the reheating, and the distortion of the neck of the jar, so that the cap could not be applied, or when applied would not be air-tight.

It is not designed to limit this invention to the use of the blow-over, to facilitate the removal of the surplus glass; but this has been referred to as one of the more efficient means by which this result can be effected.

By this process jars can be produced with less percentage of loss in manufacture, and with greater economy than by the methods heretofore in use, while they can be made perfectly air-tight, and adapted to meet the public wants.

Of course it will be understood that jars formed by this process must be annealed, as well as if formed by any other.

What is claimed as new is—

The process herein described of making the screw-neck jars, which consists in forming the jars in molds, removing the surplus glass on such a line as to leave a narrow rim or space above the upper end of the screw-thread, and finishing up the lip or upper edge of the neck by grinding, substantially as hereinbefore set forth.

THE CONSOLIDATED FRUIT JAR CO.,
By STEPHEN R. PINCKNEY, *President.*

Witnesses:
ROBERT H. DUNCAN,
BENJ. A. SMITH.